(12) United States Patent
Aguinaldo et al.

(10) Patent No.: US 11,097,203 B1
(45) Date of Patent: Aug. 24, 2021

(54) LOW ENERGY EJECTOR DESALINATION SYSTEM

(71) Applicant: Bechtel Hydrocarbon Technology Solutions, Inc., Houston, TX (US)

(72) Inventors: Jorge T. Aguinaldo, Tampa, FL (US); Joseph P. Kanzleiter, Houston, TX (US); Saurabh Tonapi, Katy, TX (US); Mukesh K. Shah, Houston, TX (US)

(73) Assignee: BECHTEL HYDROCARBON TECHNOLOGY SOLUTIONS, INC., Houston, TX (US)

( * ) Notice: Subject to any disclaimer, the term of this patent is extended or adjusted under 35 U.S.C. 154(b) by 0 days.

(21) Appl. No.: 16/969,917

(22) PCT Filed: Mar. 10, 2020

(86) PCT No.: PCT/US2020/021906
§ 371 (c)(1),
(2) Date: Aug. 13, 2020

(51) Int. Cl.
| | |
|---|---|
| *B01D 3/14* | (2006.01) |
| *B01D 3/00* | (2006.01) |
| *C02F 1/04* | (2006.01) |
| *C02F 1/16* | (2006.01) |
| *B01D 5/00* | (2006.01) |
| *B01D 1/28* | (2006.01) |
| *B01D 3/10* | (2006.01) |
| *C02F 103/08* | (2006.01) |
| *C02F 103/10* | (2006.01) |

(52) U.S. Cl.
CPC .......... *B01D 3/007* (2013.01); *B01D 1/2853* (2013.01); *B01D 3/105* (2013.01); *B01D 3/148* (2013.01); *B01D 5/006* (2013.01); *B01D 5/0039* (2013.01); *C02F 1/041* (2013.01); *C02F 1/048* (2013.01); *C02F 1/16* (2013.01); *C02F 2103/08* (2013.01); *C02F 2103/10* (2013.01); *C02F 2301/046* (2013.01); *C02F 2303/10* (2013.01)

(58) Field of Classification Search
CPC ...... B01D 1/2853; B01D 3/007; B01D 3/105; B01D 3/148; B01D 5/0039; B01D 5/006; C02F 1/041; C02F 1/048; C02F 1/16
See application file for complete search history.

(56) References Cited

U.S. PATENT DOCUMENTS

| | | |
|---|---|---|
| 3,288,685 A | 11/1966 | Kemper |
| 3,448,013 A | 6/1969 | Bailie |
| 3,499,827 A | 3/1970 | Cox |

(Continued)

FOREIGN PATENT DOCUMENTS

| | | |
|---|---|---|
| WO | 2006021796 A1 | 3/2006 |
| WO | 2014028832 A1 | 2/2014 |

(Continued)

OTHER PUBLICATIONS

Young, Lee, International Search Report and Written Opinion for PCT App. No. PCT/US20/21906, dated Jun. 24, 2020, 7 pages, USPTO, Alexandria, VA.

(Continued)

*Primary Examiner* — Jonathan Miller
(74) *Attorney, Agent, or Firm* — Crain, Caton and James

(57) ABSTRACT

A system to treat and desalinate wastewater using a low energy ejector desalination system (LEEDS), which employs a static liquid-gas ejector and maximum heat integration in the water treatment system.

21 Claims, 1 Drawing Sheet

(56) References Cited

U.S. PATENT DOCUMENTS

| | | | |
|---|---|---|---|
| 3,664,145 A | 5/1972 | Johnson | |
| 3,766,020 A | 10/1973 | Sieder | |
| 6,348,134 B1* | 2/2002 | Popov | B01D 3/10 196/114 |
| 7,225,620 B2 | 6/2007 | Klausner et al. | |
| 7,328,591 B2 | 2/2008 | Holtzapple et al. | |
| 7,575,352 B2 | 8/2009 | Van | |
| 8,080,138 B2 | 12/2011 | Nirmalakhandan et al. | |
| 8,147,697 B2 | 4/2012 | Allil | |
| 8,535,486 B2 | 9/2013 | Ng et al. | |
| 8,545,681 B2 | 10/2013 | Shapiro et al. | |
| 8,709,287 B2 | 4/2014 | Peng et al. | |
| 8,771,477 B2 | 7/2014 | Thiers | |
| 8,820,099 B2 | 9/2014 | Barbizet | |
| 9,227,857 B2 | 1/2016 | Sparrow et al. | |
| 9,539,522 B1 | 1/2017 | El-sayed | |
| 9,790,154 B2 | 10/2017 | Iijima et al. | |
| 9,802,836 B2 | 10/2017 | Thiers | |
| 9,802,845 B2 | 10/2017 | Thiers | |
| 9,834,454 B2 | 12/2017 | Frolov et al. | |
| 10,053,374 B2 | 8/2018 | Li et al. | |
| 10,189,733 B2 | 1/2019 | Wallace | |
| 10,246,345 B2 | 4/2019 | Lissianski et al. | |
| 10,322,952 B1 | 6/2019 | Bader | |
| 10,532,936 B2 | 1/2020 | Al-Azazmeh et al. | |
| 10,550,008 B2 | 2/2020 | MacDougall et al. | |
| 2008/0083605 A1 | 4/2008 | Holtzapple et al. | |
| 2012/0118722 A1 | 5/2012 | Holtzapple et al. | |
| 2013/0001065 A1 | 1/2013 | Bisht | |
| 2014/0014492 A1 | 1/2014 | Younes | |
| 2015/0251924 A1 | 9/2015 | Li et al. | |
| 2016/0145122 A1 | 5/2016 | Wilson | |
| 2016/0368785 A1 | 12/2016 | Zamir | |
| 2016/0376168 A1 | 12/2016 | Macdougall et al. | |
| 2017/0056785 A1* | 3/2017 | Popov | B01D 3/007 |
| 2017/0057834 A1* | 3/2017 | Popov | B01D 5/006 |
| 2018/0050936 A1 | 2/2018 | Thiers | |
| 2018/0272246 A1 | 9/2018 | Poinisch | |
| 2018/0282181 A1 | 10/2018 | Taylor | |
| 2018/0361269 A1* | 12/2018 | Popov | B01D 3/101 |
| 2019/0049192 A1 | 2/2019 | Noureldin et al. | |
| 2019/0184305 A1 | 6/2019 | Popov | |
| 2019/0225508 A1 | 7/2019 | Li | |

FOREIGN PATENT DOCUMENTS

| | | |
|---|---|---|
| WO | 2016000520 A1 | 7/2016 |
| WO | 2017066534 A1 | 4/2017 |
| WO | 2018132087 A1 | 7/2018 |
| WO | 2019083416 A1 | 5/2019 |

OTHER PUBLICATIONS

John H Leigh and Joseph Kaye & Company, Multiple Phase Ejector Pilot Plant, Research and Development Progress Report No. 578, Jun. 1970, 76 pages, United States Department of the Interior, United States.

Clarence A Kemper, George F Harper, S William Gouse, John H Leigh and Joseph Kaye & Company, Study of Multi-Phase Ejectors for Distillation Systems, Research and Development Progress Report No. 97, Jan. 1964, 84 pages, United States Department of the Interior, United States.

E A Cadwallader, Branch of Distillation Process, Research and Development Progress Report, 1963, 26 pages, United States Department of the Interior, Office of Saline Water, United States.

\* cited by examiner

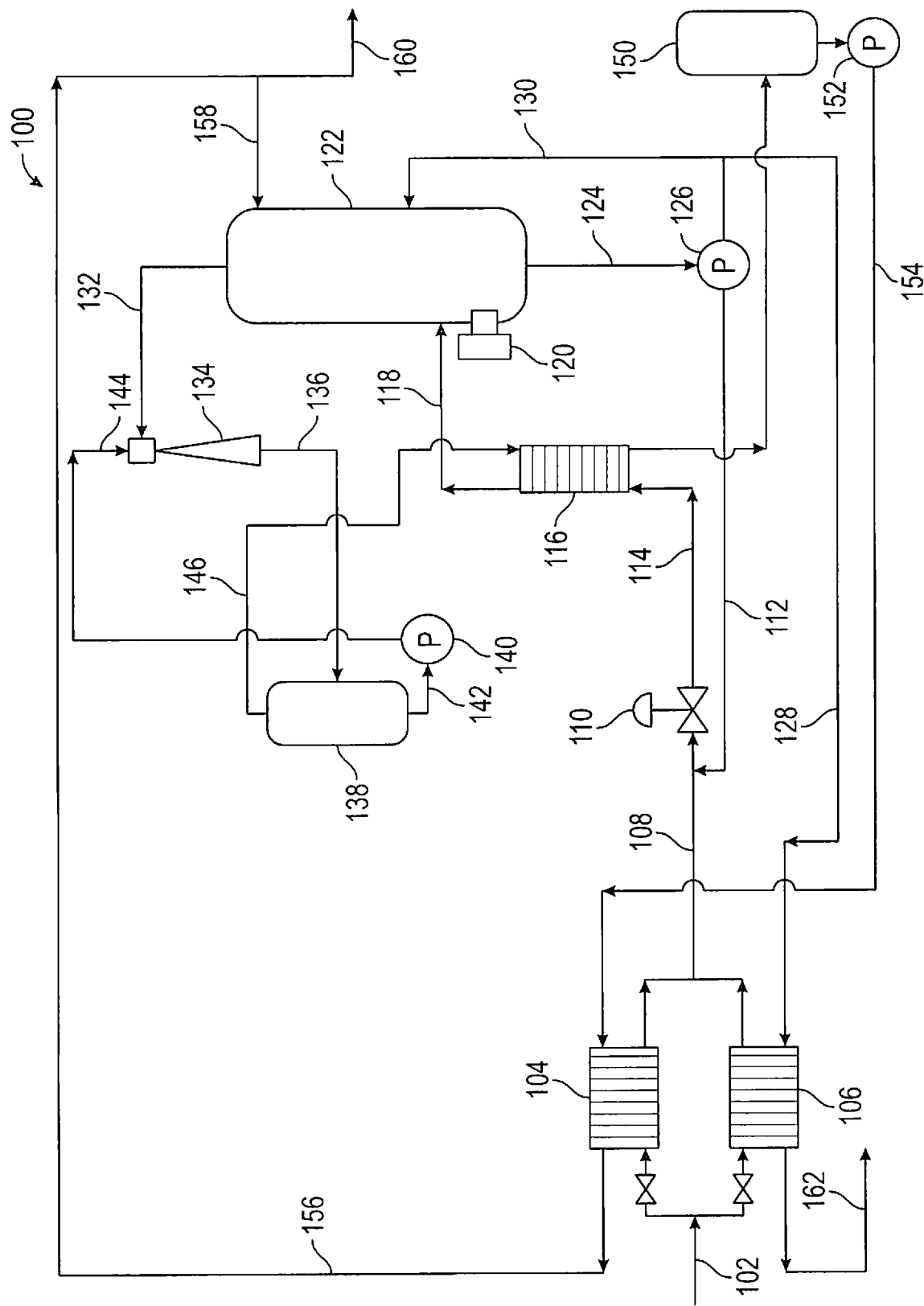

LOW ENERGY EJECTOR DESALINATION SYSTEM

CROSS-REFERENCE TO RELATED APPLICATIONS

This application is a U.S. National Stage Application of PCT Patent Application Serial No. PCT/US20/21906, filed Mar. 10, 2020, which is incorporated herein by reference.

FIELD OF THE DISCLOSURE

The present disclosure generally relates to treatment and desalination of seawater, produced water, and other high salinity water; it also has applicability to treatment of nuclear wastewater and other treatment processes requiring evaporator-based treatment. More particularly, the present disclosure relates to use of a low energy ejector desalination system (LEEDS), employing a static liquid-gas ejector (with no moving parts) and maximum heat integration in a water treatment system.

BACKGROUND

Thermal desalination processes that use steam as a heating medium typically use some amount of vapor conditioning system to extract heat from the available steam through heat transfer. When these processes use vapor compression, either thermal or mechanical, they typically require auxiliary steam for start-up and to enhance normal operations.

The auxiliary steam for start-up and to enhance normal operations generally requires a fossil-fuel fired boiler to make the steam. The boiler for the auxiliary steam will usually require an air emissions permit to address emissions from fossil fuel combustion, which can include carbon monoxide, nitrogen oxides, and carbon dioxide. Permitting the boiler can be a challenge for facilities that do not normally produce steam (such as LNG) or facilities in environmentally sensitive areas or in other areas where air emission permits are difficult to obtain. Eliminating the need for the boiler has the further advantage of avoiding combustion of the boiler fuel and the associated emissions.

BRIEF DESCRIPTION OF THE DRAWING

The present disclosure is described below with references to the accompanying drawing, and in which:

FIG. 1 is a schematic diagram illustrating one embodiment of a LEEDS process according to the present disclosure.

DETAILED DESCRIPTION OF THE ILLUSTRATIVE EMBODIMENT

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following FIGURES and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. All streams described are carried by physical lines. To the extent that temperatures and pressures are referenced in the following description, those conditions are merely illustrative and are not meant to limit the disclosure.

The present disclosure overcomes one or more deficiencies in the prior art by providing a process for treatment and desalination of wastewater that does not require auxiliary steam during start-up or to enhance normal operations, thus eliminating the need to use (and obtain an air emissions permit for) a boiler for the auxiliary steam. The ability to treat high salt content wastewater without requiring steam augmentation is a primary component that sets the process apart from conventional processes in the market. The process also allows maximum use of pumps to convey streams. These are principally accomplished by use of the static liquid-gas ejector (with no moving parts) and maximum heat integration in the water treatment system.

In one embodiment, the present disclosure includes a system for treating a raw wastewater feed stream, comprising: i) a heat exchanger to heat a wastewater stream and create a two-phase stream; ii) a column in fluid communication with the heat exchanger for separating the two-phase stream into a vapor stream and a concentrated liquid stream; iii) an ejector in fluid communication with the column for combining the vapor stream from the column and a high temperature liquid stream to produce an ejector two-phase stream; iv) a knockout drum in fluid communication with the ejector that separates the ejector two-phase stream into a hot vapor stream and the high temperature liquid stream; v) a pump in fluid communication with the knockout drum to convey the high temperature liquid stream from the knockout drum to the ejector; and vi) a degasser in fluid communication with and positioned downstream from the heat exchanger for collecting the hot vapor stream leaving the heat exchanger and producing a distillate stream.

In another embodiment, the present disclosure includes a method for treating a raw wastewater feed stream, comprising: i) heating a wastewater stream to create a two-phase stream; ii) separating the two-phase stream in a column into a vapor stream and a concentrated liquid stream; iii) combining the vapor stream and a high temperature liquid stream to produce another two-phase stream with a temperature higher than that of the vapor stream; iv) separating the another two-phase stream into a hot vapor stream and the high temperature liquid stream; v) condensing the hot vapor stream; and vi) producing a distillate stream.

Referring now to FIG. 1, the system 100 is a low energy ejector desalination system for treating a pre-treated or pre-conditioned raw wastewater feed stream 102, which may comprise saline water. The pre-treatment or pre-conditioning of the raw wastewater feed stream 102 minimizes scaling in the heat exchangers and other heated equipment. The raw wastewater feed stream 102 is conveyed to two parallel heat exchangers comprising a distillate stream heat exchanger 104 and another recirculated concentrated liquid stream heat exchanger 106. The heated raw wastewater feed stream 108 is then mixed with a recirculated concentrated liquid stream 112. A flow regulator 110, which may be a valve, controls the mixture of the heated raw wastewater feed stream 108 and the recirculated concentrated liquid stream 112, which is conveyed to a heat exchanger 116 and exits as a two-phase stream 118.

The two-phase stream 118 is separated in the column 122 into a concentrated liquid stream 124, which may comprise brine, and a vapor stream 132, which may comprise water. The column 122 can have a start-up electric heating element 120 to heat fluid in the column, which may comprise raw wastewater.

The vapor stream 132 is mixed with and compressed by a high temperature liquid stream 142 acting as a motive fluid 144 as they enter an ejector 134. A two-phase stream exits the ejector as an ejector two-phase stream 136, which is at a temperature slightly higher than that of the vapor stream 132, then enters the knockout drum 138 to separate the ejector two-phase stream 136 into a hot vapor stream 146, which may comprise water, and a high temperature liquid stream 142.

The hot vapor stream 146 enters the hot side inlet to the heat exchanger 116 to partially vaporize a wastewater stream 114 comprising the heated raw wastewater feed stream 108 and the recirculated concentrated liquid stream 112 before being delivered as a condensed hot vapor stream to a degasser 150 for collection. In order to boost the efficiency of the system, a mechanical vapor compressor may be utilized to boost and compress the hot vapor stream 146 before entering the heat exchanger 116.

The high temperature liquid stream 142 exits the knockout drum 138 and after conveyance by a pump 140 at high pressure and motive flow becomes the high temperature liquid stream, which may comprise water (distillate), acting as a motive fluid 144 to compress the vapor stream 132 drawn in from the column 122.

The concentrated liquid stream 124 is collected and controlled in the bottom of the column 122. The concentrated liquid stream 124 exiting the bottom of the column 122 is conveyed by a hot brine pump 126.

The discharge from the hot brine pump 126 can be separated by sufficient valves and piping into: i) a recycled concentrated liquid stream 130 for the column 122; ii) another recirculated concentrated liquid stream 128, which becomes a brine product stream 162 for collection; or iii) the recirculated concentrated liquid stream 112, which is combined with the heated raw wastewater feed stream 108 to produce the wastewater stream 114. The wastewater stream 114 is partially vaporized in the heat exchanger 116, which may be regulated by the flow regulator 110 to manage operating performance.

Exiting the degasser 150 is distillate stream 154, which is conveyed via the distillate pump 152 to the distillate stream heat exchanger 104 to boost the temperature of the raw wastewater feed stream 102. A cooled distillate stream 156 can, using sufficient valves and piping, be recycled as a distillate recycle stream 158 to the column 122, to manage operation, or recovered as a distillate product stream 160.

The system 100 is unique, simple, and environmentally friendly; both products produced by the system 100, the brine product stream 162 and the distillate product stream 160, are value added. The elimination of an auxiliary boiler is accomplished using the ejector 134 to drive and compress the vapor stream 132, from the top of the column 122 into the ejector 134, which allows the ejector two-phase stream 136 at a higher temperature to exit from the ejector 134. Further efficiency and heat conservation are accomplished by using the degasser 150 for the hot vapor stream 146 exiting the knockout drum 138 and the heat exchanger 116 to allow that stream to be conveyed via the distillate pump 152 to heat the raw wastewater feed stream 102 in the distillate stream heat exchanger 104 and produce the distillate product stream 160.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A system for treating a raw wastewater feed stream, comprising:
   a heat exchanger to heat a wastewater stream and create a two-phase stream;
   a column in fluid communication with the heat exchanger for separating the two-phase stream into a vapor stream and a concentrated liquid stream;
   an ejector in fluid communication with the column for combining the vapor stream from the column and a high temperature liquid stream to produce an ejector two-phase stream;
   a knockout drum in fluid communication with the ejector that separates the ejector two-phase stream into a hot vapor stream and the high temperature liquid stream;
   a pump in fluid communication with the knockout drum to convey the high temperature liquid stream from the knockout drum to the ejector; and
   a degasser in fluid communication with and positioned downstream from the heat exchanger for collecting the hot vapor stream leaving the heat exchanger and producing a distillate stream.

2. The system of claim 1, further comprising a startup electric heating element to heat fluid in the column.

3. The system of claim 1, wherein the raw wastewater feed stream has dissolved solids constituents that accumulate in the concentrated liquid stream.

4. The system of claim 1, further comprising two parallel heat exchangers to heat the raw wastewater feed stream, wherein the hot side of one of the two parallel heat exchangers is the distillate stream from the degasser and the hot side of another one of the two parallel heat exchangers is a recirculated concentrated liquid stream from the column.

5. The system of claim 4, wherein the column is in fluid communication with the distillate stream.

6. The system of claim 5, further comprising a pump to facilitate transfer of a portion of the concentrated liquid stream to the column as a recycled concentrated liquid stream and to the another one of the two heat exchangers as the recirculated concentrated liquid stream.

7. The system of claim 6, wherein the heat exchanger is an evaporative heat exchanger downstream from the two parallel heat exchangers.

8. The system of claim 7, wherein the hot side of the evaporative heat exchanger is the hot vapor stream from the knockout drum.

9. The system of claim 8, further comprising a flow regulator for controlling the combination of the concentrated liquid stream and a heated raw wastewater feed stream.

10. The system of claim 9, wherein the ejector is a static liquid-gas ejector.

11. The system of claim 1, further comprising a compressor in fluid communication with the knockout drum for compressing the hot vapor stream.

12. A method for treating a raw wastewater feed stream, comprising:

heating a wastewater stream to create a two-phase stream;

separating the two-phase stream in a column into a vapor stream and a concentrated liquid stream;

combining the vapor stream and a high temperature liquid stream to produce another two-phase stream with a temperature higher than that of the vapor stream;

separating the another two-phase stream into a hot vapor stream and the high temperature liquid stream;

condensing the hot vapor stream; and producing a distillate stream.

13. The method of claim 12, further comprising applying heat to the column from an external source.

14. The method of claim 12, wherein the raw wastewater feed stream has dissolved solids constituents that accumulate in the concentrated liquid stream.

15. The method of claim 12, wherein a portion of the raw wastewater feed stream is heated by the distillate stream and the hot vapor stream.

16. The method of claim 12, wherein a portion of the raw wastewater feed stream is heated by the concentrated liquid stream and the hot vapor stream.

17. The method of claim 12, wherein the distillate stream is in fluid communication with the two-phase stream.

18. The method of claim 15, wherein the portion of the raw wastewater feed stream is heated by the distillate stream before being heated by the hot vapor stream.

19. The method of claim 16, wherein the portion of the raw wastewater feed stream is heated by the concentrated liquid stream before being heated by the hot vapor stream.

20. The method of claim 12, wherein the concentrated liquid stream is combined with the heated wastewater stream after a portion of the raw wastewater feed stream is heated by the distillate stream and the hot vapor stream.

21. The method of claim 12, wherein the high temperature liquid stream is used as a motive fluid.

\* \* \* \* \*